(12) United States Patent
Brandau et al.

(10) Patent No.: US 10,449,859 B2
(45) Date of Patent: Oct. 22, 2019

(54) FUEL CELL VEHICLE HAVING A PLURALITY OF SELECTABLE OPERATING MODES

(71) Applicant: VOLKSWAGEN AG, Wolfsburg (DE)

(72) Inventors: Nils Brandau, Lehre (DE); Christian Schröder, Braunschweig (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 104 days.

(21) Appl. No.: 15/592,130

(22) Filed: May 10, 2017

(65) Prior Publication Data

US 2017/0326985 A1    Nov. 16, 2017

(30) Foreign Application Priority Data

May 11, 2016   (DE) .......................... 10 2016 208 082

(51) Int. Cl.
*B60L 1/08*       (2006.01)
*H01M 8/04992*    (2016.01)
(Continued)

(52) U.S. Cl.
CPC ............ *B60L 1/08* (2013.01); *B60H 1/00392* (2013.01); *B60H 1/00735* (2013.01);
(Continued)

(58) Field of Classification Search
CPC ........ B60L 1/08; B60L 1/003; B60L 11/1881; B60H 1/00392; B60H 1/00735;
(Continued)

(56) References Cited

U.S. PATENT DOCUMENTS 6,680,592 B2   1/2004   Blum
8,049,359 B2   11/2011  Kinser et al.
(Continued)

FOREIGN PATENT DOCUMENTS

DE   196 17 548 A1   11/1997
DE   100 63 654 A1   7/2002
(Continued)

*Primary Examiner* — Tuan C To
(74) *Attorney, Agent, or Firm* — Seed IP Law Group LLP (57) ABSTRACT

The invention relates to a fuel cell vehicle (200), in which the driver has more influence on the consumption and the dynamic of the vehicle (200). This is achieved by the fuel cell vehicle (200) comprising at least one sensor for detecting a first driver input and a control unit (60). The control unit (60) is configured to operate the fuel cell vehicle (200) in one of a plurality of operating modes depending on the first driver input, wherein a power consumption $P_{AC}$ of the air-conditioning system (70), an operating range of the fuel cell stack (10), and a transfer function for determining the power demand $P_{EM}$ from the second driver input are varied depending on the selected operating mode. It is provided that the driver has at least five different operating modes available, which differ in particular with respect to the available driving dynamic, the fuel consumption, and the adjustable comfort.

17 Claims, 2 Drawing Sheets

(51) Int. Cl.
 *B60L 1/00*  (2006.01)
 *B60H 1/00*  (2006.01)
 *B60L 11/18*  (2006.01)
 *H01M 8/04007*  (2016.01)
 *H01M 8/0432*  (2016.01)
 *B60L 58/30*  (2019.01)
 *B60H 1/32*  (2006.01)
 *H01M 8/04828*  (2016.01)

(52) U.S. Cl.
 CPC .......... *B60H 1/32281* (2019.05); *B60L 1/003* (2013.01); *B60L 58/30* (2019.02); *H01M 8/0432* (2013.01); *H01M 8/04067* (2013.01); *H01M 8/0494* (2013.01); *H01M 8/04992* (2013.01); *H01M 2250/20* (2013.01); *Y02T 90/32* (2013.01); *Y02T 90/34* (2013.01)

(58) Field of Classification Search
 CPC ........... H01M 8/04067; H01M 8/0432; H01M 8/0494; H01M 8/04992; H01M 2250/20; Y02T 90/32; Y02T 90/34
 USPC .......................................................... 701/22
 See application file for complete search history.

(56) References Cited

U.S. PATENT DOCUMENTS

| | | | | |
|---|---|---|---|---|
| 8,642,222 | B2* | 2/2014 | Schaffnit | H01M 8/04089 |
| | | | | 429/430 |
| 10,059,287 | B2* | 8/2018 | Dufford | G01C 21/3407 |
| 2006/0286419 | A1 | 12/2006 | Binder et al. | |
| 2009/0126902 | A1* | 5/2009 | Choe | H01M 8/04007 |
| | | | | 165/41 |
| 2010/0112402 | A1* | 5/2010 | Ogawa | H01M 8/04089 |
| | | | | 429/513 |
| 2011/0014536 | A1* | 1/2011 | Yoshida | H01M 8/04089 |
| | | | | 429/432 |
| 2011/0196554 | A1* | 8/2011 | Limbeck | B60L 11/1885 |
| | | | | 701/22 |
| 2011/0286913 | A1* | 11/2011 | Lugtigheid | C01B 3/065 |
| | | | | 423/658.2 |
| 2012/0095637 | A1* | 4/2012 | Katano | B60L 58/30 |
| | | | | 701/22 |
| 2013/0040219 | A1* | 2/2013 | Naganuma | H01M 8/04014 |
| | | | | 429/429 |
| 2013/0238180 | A1* | 9/2013 | Bold | B60H 1/00278 |
| | | | | 701/22 |
| 2014/0170511 | A1* | 6/2014 | Tolmachev | H01M 8/08 |
| | | | | 429/418 |
| 2015/0107814 | A1* | 4/2015 | Jeong | B60L 1/12 |
| | | | | 165/202 |
| 2015/0112577 | A1* | 4/2015 | Velusamy | F02D 41/2422 |
| | | | | 701/110 |
| 2016/0111734 | A1* | 4/2016 | Lee | H01M 8/0276 |
| | | | | 429/483 |
| 2016/0141905 | A1* | 5/2016 | Yamanaka | B60L 11/1805 |
| | | | | 320/135 |
| 2016/0304076 | A1* | 10/2016 | Nefcy | B60W 30/19 |
| 2017/0077534 | A1* | 3/2017 | Guidry | H01M 8/04111 |
| 2017/0092967 | A1* | 3/2017 | Ko | H01M 8/04225 |
| 2017/0214070 | A1* | 7/2017 | Wang | H01M 8/04865 |
| 2017/0352895 | A1* | 12/2017 | Braillard | H01M 8/04529 |
| 2018/0035606 | A1* | 2/2018 | Burdoucci | A01D 34/008 |
| 2018/0219238 | A1* | 8/2018 | Tanaka | H01M 8/0488 |
| 2018/0248208 | A1* | 8/2018 | Aoki | H01M 8/04 |

FOREIGN PATENT DOCUMENTS

| | | |
|---|---|---|
| DE | 10 2005 027 651 A1 | 12/2006 |
| DE | 10 2010 048 353 A1 | 6/2011 |
| DE | 10 2012 018 710 A1 | 3/2014 |

* cited by examiner

FUEL CELL VEHICLE HAVING A PLURALITY OF SELECTABLE OPERATING MODES

BACKGROUND

Technical Field

The invention relates to a fuel cell vehicle having a plurality of selectable operating modes, in particular five selectable operating modes.

Description of the Related Art

Fuel cells use the chemical conversion of a fuel with oxygen into water in order to generate electrical energy. For this purpose, fuel cells contain the so called membrane electrode assembly (MEA) as a core component, which is an arrangement of an ion-conducting (often proton-conducting) membrane and of a catalytic electrode (anode and cathode), respectively arranged on both sides of the membrane.

Generally the fuel cell is constituted by a plurality of MEAs arranged in the stack, the electrical power outputs of which MEAs accumulate. Between the individual membrane electrode assemblies, bipolar plates (also called flow field plates or separator plates) are usually arranged, which ensure a supply of the individual cells with the operating media, i.e. the reactants, and are usually also used for cooling. In addition, the bipolar plates also ensure an electrically conductive contact to the membrane electrode assemblies.

BRIEF SUMMARY

The electrical power $P_{stack}$ delivered by a fuel cell stack generally depends on a power demand made on the fuel cell stack, i.e. the current depth of a current sink downstream, as well as on the operating medium flows delivered to the fuel cell stack, in particular the cathode and anode operating current. When using a fuel cell for providing an electrical power, it must furthermore be taken into consideration that for operating a fuel cell stack, a plurality of auxiliary units is required, which also consume an electrical power $P_{aux}$.

Depending on the fuel cell system, the plurality of auxiliary units can be comprised of at least one air compressor, a recirculation fan, a cooling water pump, valves, sensors, etc. The power consumption of these components can be called a parasitic power consumption $P_{aux}$, since it must indeed be provided by the fuel cell stack but is not available to external consumers. The net power available to external consumers of the fuel cell system $P_{net}$ thus results as the difference of the electrical power $P_{stack}$ produced by the stack and the parasitic power consumption $P_{aux}$. The net power available to external consumers (such as the electric drive) in accordance with $P_{net}=P_{stack}-P_{aux}$ is thus always below the power of the fuel cell stack $P_{stack}$.

Known fuel cell systems have a certain inertia in managing power demands, such as during acceleration of a fuel cell-driven vehicle. The inertia results on the one hand from the inertia of the operating medium mass flows to be moved as well as from the mass inertia of the auxiliary units themselves. For example, the compressor on the cathode side for transporting the demanded, increased cathode operating medium flow must be accelerated. As a result of this acceleration, the electrical power consumption of the at least one auxiliary consumer $P_{aux}$ also increases up to a local maximum $P_{aux}^{max}$. The useful power $P_{net}$ of the fuel cell stack thus has a local minimum in comparison to the stack power $P_{stack}$.

A fuel cell vehicle describes a vehicle that is exclusively or at least largely driven by a fuel cell system. In doing so, any configurations of fuel cells, such as PEM, SOFC, and others, come into consideration as fuel cell systems. Within the scope of this application, a hydrogen-air PEM fuel cell is assumed only representatively, without being limited thereto. At least one electric traction motor arranged in the fuel cell vehicle is operated by the fuel cell system in order to generate a torque. The fuel cell system generally also operates additional onboard systems of the vehicle, such as an air-conditioning system. The fuel cell vehicle can moreover be driven auxiliarily by an energy storage unit, e.g. a battery.

A vehicle equipped with a fuel cell system generally comprises a control unit for operating the fuel cell system, in particular its anode and cathode supply. The control unit initially detects as control value a traction power $P_W$ demanded by the driver of the vehicle, generally from the force of the accelerator pedal operation. From the pedal value or the driving performance demanded PW, a power demand PEM of an electric motor is determined using a transfer function. The control unit generally detects the power demands of additional electrical consumers of the vehicle, such as the power demand $P_{AC}$ of an air-conditioning system. Depending on the power demands detected, in particular $P_{EM}$ of the electric motor and PAC of the air-conditioning system, the control unit determines either directly a power $P_{stack}$ to be provided by the fuel cell stack or initially a net power $P_{net}$ corresponding to the sum of the power demands.

If a power $P_{stack}$ to be provided is determined directly from the power demand of the at least one consumer and is demanded from the fuel cell stack, the latter actually delivers a net power $P_{net}$, which is reduced by the power consumption of at least one auxiliary unit $P_{aux}$ ($P_{net}=P_{stack}-P_{aux}$). By determining the net power delivered by the stack, e.g. by measuring the current delivered by the stack, the power demanded from the fuel cell stack can subsequently be adjusted until the net power delivered corresponds to the power demand. Alternatively, the control unit determines a power consumption a $P_{aux}$ of the at least one auxiliary unit, e.g. by means of a characteristic diagram (LUT), which power consumption is required for providing a stack net power $P_{net}$ in the amount of the power demand, e.g. $P_{AC}+P_{EM}$, and ultimately from it the total power $P_{stack}$ to be demanded from the fuel cell stack in accordance with $P_{stack}=P_{net}+P_{aux}$.

Based on the net power $P_{net}$ to be provided or the stack power $P_{stack}$, the control unit determines from calculations or stored characteristic diagrams the required mass flows and/or operating pressures of the anode and cathode operating medium and accordingly controls or regulates the auxiliary units of the fuel cell system, in particular a compressor for supplying the cathode side with air as well as adjusting means for supplying the anode side with hydrogen.

A maximum power output of the fuel cell system is defined by a voltage $U(\eta_{max})$ and a current $I(\eta_{max})$, where $\eta_{max}$ denotes a maximum efficiency of the fuel cell system arranged in the vehicle. The efficiency $\eta$ of a fuel cell system arranged in a vehicle describes the ratio of a power of the fuel cell system to the stack power and thus also depends on all conversion losses within the system chain of the electrical vehicle system. The useful power of the fuel cell system thus results as $P_{system}=\eta*P_{stack}$. Depending on the operating state of the fuel cell vehicle, the system chain can comprise different levels, such as the fuel cell stack, an energy converter, transfer losses and storage losses in the vehicle battery, the electric drive, and/or auxiliary units of the fuel cell system and additional consumers of the fuel cell vehicle.

The efficiency curve η of the fuel cell system of a fuel cell vehicle is initially defined during its development. From the prior art are known methods for operating the fuel cell system of a fuel cell vehicle as often as possible at an efficiency-optimized operating point. However, this is generally associated with a reduced dynamic of the fuel cell system and thus of the vehicle. In addition, the aging of the fuel cell stack or the resulting changes of the efficiency curve must be taken into consideration.

DE 10063654 A1 describes a method for operating a fuel cell system, wherein in addition to the power demand of an electric motor, the power demands of other consumers and of the auxiliary units of the fuel cell system are also taken into consideration. The power output of the fuel cell system is to thus be adjusted such that a dynamic desired by the driver can be provided despite the additional power demands.

In contrast to a combustion engine, a fuel cell system provides electrical energy directly. Methods for operating fuel cell systems are therefore known, which methods take into consideration a current charge state (SOC) of a vehicle battery. From DE 102012018710 A1 is known a method, which takes into consideration for operating the fuel cell system the operating state of a battery as an additional electrical consumer. In this case, the fuel cell system is always operated at a characteristic power $P_C$. If a current power demand is less than $P_C$, the excess power is delivered to the battery. The amount of the characteristic power $P_C$ can in this case be influenced by the driver depending on a selected driving mode.

For the user of the fuel cell vehicle, i.e. the driver, operating states of the fuel cell system are generally as inaccessible as the charge state of the battery or the power consumption of additional consumers. The driver of a known fuel cell vehicle can thus hardly influence the operating method and the efficiency of the fuel cell system. It is just as difficult for the driver to estimate the current consumption of the vehicle. In the end, the influence of the driver on the consumption and the driving dynamic of his vehicle is very limited.

The invention is now based on the task of providing a fuel cell vehicle, the consumption and dynamic of which can be influenced to a greater extent by the driver or the user.

This task is achieved by a fuel cell vehicle having the features of the independent claim. The fuel cell vehicle according to the invention comprises a fuel cell system configured to provide an electrical power $P_{stack}$, and at least one auxiliary unit configured to operate the fuel cell stack and having an electrical power consumption $P_{aux}$. The fuel cell vehicle furthermore comprises an air-conditioning system for regulating the temperature of a vehicle interior space, which air-conditioning system comprises at least one electric auxiliary heater and one air-conditioning compressor, wherein all components of the air-conditioning system have a collective electrical power demand $P_{AC}$. The fuel cell vehicle furthermore comprises an electric drive motor having a power demand $P_{EM}$. Finally, the fuel cell vehicle comprises a control unit and a plurality of sensors configured at least to detect an outside temperature, a first driver input, and a second driver input.

According to the invention, the control unit of the fuel cell vehicle is configured to operate the fuel cell vehicle in one of a plurality of operating modes, preferably in one of five operating modes, depending on the first driver input, wherein a power consumption $P_{AC}$ of the air-conditioning system, an operating range of the fuel cell stack, in particular the location and the amount of additional operating points of the fuel cell stack, and a transfer function for determining the power demand $P_{EM}$ from the second driver input are varied depending on the selected operating mode.

It has been shown that the operating range of a fuel cell stack, the power consumption of an air-conditioning system, and the transfer function for determining the power demand $P_{EM}$ from the second driver input constitute decisive parameters for the dynamic and consumption of a fuel cell vehicle. By varying these parameters based on the first driver input, the driver thus advantageously has a better influence on the driving and consumption properties of his vehicle. Since the meaning of these parameters is easy to understand, by varying them, a plurality of different operating modes can be easily defined, the differences of which are easily accessible to the driver.

The operating range of a fuel cell stack denotes the set of the operating points permissible for the fuel cell stack. In other words, the operating range includes the operating points that the fuel cell stack of the fuel cell vehicle can be at in a selected operating mode. An operating point A of the fuel cell stack is in this respect unambiguously determined by a point of the current-voltage characteristic curve of the stack by $P_A = U_A * I_A$. Each operating point corresponds in this case to at least one specific operating state of the fuel cell stack, which is furthermore defined by the operating medium flows delivered to it. The operating state depends on additional parameters, such as the temperature and the moisture content of the stack. An operating point B of the fuel cell system is unambiguously determined by a point of the efficiency $\eta_B$ and by the voltage and current of the stack at that point by $P(\eta_B) = \eta_B * U_B * I_B$.

The transfer function for determining the power demand $P_{EM}$ from the second driver input, preferably from a pedal value $P_W$ or a driving performance $P_W$ demanded, defines a transfer behavior, preferably a proportional transfer behavior, between the direct wish of the driver, i.e. the operation of the pedal, and a power demand $P_{EM}$ made to the electric motor of the fuel cell vehicle. Using the transfer function, it is thus determined what electrical power of the fuel cell system is demanded how quickly in order to implement a mechanical torque desired by the driver. Within the scope of this application, a variation of the transfer function comprises a variation of the transfer function itself and the variation of reference variables and/or control variables of the transfer function.

In addition to the transfer function for determining the power demand $P_{EM}$ from the second driver input, additional transfer functions can be implemented in the control unit, in particular for determining the power demand $P_{AC}$, e.g. based on a current temperature and a temperature, desired by the driver, of the vehicle interior space. In order to determine a total power $P_{net}$ or $P_{stack}$ to be provided by the stack, the different transfer functions are superposed by the control unit. In the control unit, the transfer functions are realized as program elements or as distinct components and are preferably designed as control technology transfer element, e.g. as continuous linear controller. Within the scope of this application, the control unit is to be understood as a functional unit, wherein the implementation of the functions can take place in components of the fuel cell vehicle and/or in components of the fuel cell system.

In a preferred embodiment of the fuel cell vehicle according to the invention, the control unit is furthermore configured to operate the fuel cell vehicle depending on the first driver input in a first operating mode, in particular in an efficiency-optimized operating mode (efficiency mode). In doing so, the control unit is configured to provide the air-conditioning system in a limited manner depending on the outside temperature, to operate the fuel cell stack at or near an efficiency-optimal operating point, and to select the transfer function for determining the power demand $P_{EM}$ such that the fuel cell stack provides a net power $P_{net}$ with a non-minimal delay in accordance with the second driver input.

The efficiency-optimal operating point $P(\eta_{max})$ is an operating point, where the maximally possible system efficiency $\eta_{max}$ of the fuel cell system is at least approximately reached. $P(\eta_{max})$ within the scope of this application is understood as an efficiency-optimal operating point of the fuel cell system of the fuel cell vehicle. Even though, strictly speaking, this is also an operating point of the fuel cell stack, it is however determined depending on the fuel cell system and the consumers arranged in the fuel cell vehicle and supplied by the fuel cell system.

The control unit provides the air-conditioning system in a limited manner depending on a temperature detected by at least one sensor, preferably an outside temperature, by throttling the components of the air-conditioning system depending on the temperature detected and independently of one another. This means that the control unit throttles the power demanded by the auxiliary heater or compressor depending on the temperature. The throttling of the power demanded by the auxiliary heater or compressor is at most 100% of the total power that can be demanded from this component. In other words, the control unit can completely turn off the auxiliary heater and/or the air-conditioning compressor depending on a temperature.

In a particularly preferred embodiment, the control unit throttles the air-conditioning system based on temperature-dependent throttling functions of the air-conditioning compressor and the auxiliary heater, which functions are essentially inverse to one another. The air-conditioning compressor is preferably throttled when the temperature drops, and the auxiliary heater is preferably throttled when the temperature rises. This saves energy, e.g. by throttling or ceasing the operation of the compressor if the outside air of the vehicle is sufficient to cool its interior space.

The operation of the fuel cell stack at or near an efficiency-optimal operating point corresponds to the operation of the fuel cell stack within an efficiency-optimized operating range. Within the efficiency-optimized range, the fuel cell stack produces a power $P_{stack}(\eta_{opt})$ in the amount of at least 70%, preferably 80%, and particularly preferably 90% of the power of the fuel cell stack at the efficiency-optimal operating point. Particularly at low load, for example as a result of a low current draw in standby mode, the available useful power decreases in proportion to the stack power and the efficiency of the fuel cell system, thus, decreases disproportionately as a result of the operated auxiliary units. In addition, the following applies to the system efficiency $\eta = P_{system}/P_{stack}$ and with $P_{system} \leq P_{net} = P_{stack} - P_{aux}$, thus in particular $\eta \leq 1 - P_{aux}/P_{stack}$.

Furthermore, the conversion losses in consumers, supplied by the fuel cell system, of the fuel cell vehicle are included in the system efficiency. In particular, storage losses of an energy storage unit or the efficiency of an electric motor connected to the fuel cell vehicle affect the system efficiency. The storage losses in turn depend on the charge state (SOC) of the energy storage unit, and the efficiency of the electric motor depends on its operating state, e.g. its rotational speed. The efficiency-optimal operating point $P(\eta_{max})$ thus can vary during operation of the fuel cell system or of the fuel cell vehicle. During operation of the fuel cell vehicle at or near the efficiency-optimized operation point or in the efficiency-optimized operating range, the fuel consumption of the fuel cell vehicle is advantageously minimal.

In the first operating mode, the control unit selects the transfer function for determining the power demand $P_{EM}$ such that the fuel cell stack provides a net power $P_{net}$ in accordance with the second driver input. A transfer function is thus selected, which maps the pedal value to the power demand $P_{EM}$ such that the net power $P_{net}$ provided by the fuel cell stack as a result of the power demand $P_{EM}$ is sufficient to provide the torque demanded by the driver. Load increases signify a temporary maximum of the power consumption $P_{aux}^{max}$ of the at least one auxiliary unit. By using the transfer function to determine a power demand $P_{EM}$, as a result of which an electric motor delivers a net power $P_{net}$ that is just sufficient to provide the demanded torque, the actually usable power is temporarily reduced as a result of $P^{max}_{aux} P_{aux}^{max}$. The desired torque can thus not be provided until the at least one auxiliary unit is in the steady state, and the available acceleration of the vehicle is consequently limited.

In the first operating mode, the control unit furthermore selects the transfer function for determining the power demand $P_{EM}$ such that the fuel cell stack provides this power with non-minimal delay. The minimal delay corresponds to the shortest period of time that the electric motor requires for providing the required torque or for developing a corresponding power demand $P_{EM}$. Based on the transfer function selected in the first operating mode, a power demand $P_{EM}$ is determined, as a result of which the electric motor provides the torque more slowly than this shortest period of time. This results in a reduced acceleration of the at least one auxiliary unit and thus to a reduced maximum power consumption $P_{aux}^{max}$ of the at least one auxiliary unit. As a result of the selected transfer function, the demanded torque is thus indeed available later, but the required electrical power for this purpose is advantageously reduced. Overall, the response behavior or the throttle response of the vehicle is reduced.

In a preferred embodiment of the fuel cell vehicle according to the invention, the control unit is furthermore configured to operate the fuel cell vehicle depending on the first driver input in a second operating mode, in particular in a comfort-optimized operating mode (comfort mode). In doing so, the control unit is configured to, in the second operating mode, provide the air-conditioning system in an unlimited manner independently of the outside temperature, to operate the fuel cell stack at or near an operating point with minimal sound emission, and to select the transfer function for determining the power demand $P_{EM}$ such that the fuel cell stack provides a net power $P_{net}$ with a non-minimal delay in accordance with the second driver input and a maximum power consumption $P_{aux}^{max}$ to be expected of the at least one auxiliary unit.

In the second operating mode, no throttling of the power consumption $P_{AC}$ of the air-conditioning system, i.e. of the auxiliary heater and the air-conditioning compressor, is carried out by the control unit. The power consumption $P_{AC}$ is thus indeed higher than in the first operating mode, but there are also no limitations in the function of the air-conditioning system. In the second operating mode, the control unit furthermore operates the fuel cell stack at an operating point with minimal sound emission, which in particular refers to the sound emission of the entire fuel cell system. This operating point was preferably determined during the development of the fuel cell system and is stored in the control unit.

The control unit also selects a transfer function, which maps the pedal value $P_W$ to the power demand $P_{EM}$ such that the net power $P_{net}$ provided by the fuel cell stack as a result of the power demand $P_{EM}$ is sufficient to provide the torque demanded by the driver and an approximated maximum power consumption $P_{aux}$ of the at least one auxiliary unit when providing a power $P_{net}$ corresponding to the desired torque. Since the net power available for acceleration is thus not reduced by $P_{aux}$, the full acceleration is consequently available to the vehicle.

This stack net power is provided with a (non-minimal) delay as a result of the selected transfer function in order to keep the power consumption $P_{aux}$ of the at least one auxiliary unit as low as possible. The response behavior or the gas acceptance of the vehicle is thus indeed limited, but in return, a particularly even acceleration, preferably without "turbo lags," is realized. The control unit is preferably configured to determine the non-minimal delay such that the maximum power consumption $P_{aux}^{max}$ of the at least one auxiliary consumer is reduced.

In a preferred embodiment of the fuel cell vehicle according to the invention, the control unit is furthermore configured to operate the fuel cell vehicle depending on the first driver input in a third operating mode, in particular in a dynamic-optimized operating mode (dynamic mode). In doing so, the control unit is configured to, in the third operating mode, provide the air-conditioning system in a limited manner depending on the outside temperature, to operate the fuel cell stack at an arbitrary operating point, and to select the transfer function for determining the power demand $P_{EM}$ such that the fuel cell stack provides a net power $P_{net}$ with a minimal delay in accordance with the second driver input and a maximum power consumption $P_{aux}^{max}$ to be expected of the at least one auxiliary unit.

As in the first operating mode, the temperature-dependent throttling of the air-conditioning system saves energy. In contrast to the first operating mode, this energy is however provided to the drive, in particular the electric motor. In the third operating mode, the control unit furthermore operates the fuel cell stack at an arbitrary permissible operating point and thus over a far larger operating range than in the first or second operating mode. Both brings about an improved dynamic in the power provision of the fuel cell stack. The operating range permissible in the third operating mode is preferably defined by a minimum operating point of the fuel cell stack, below which a power output of the stack must not fall in order to prevent processes damaging the service life in the stack. The permissible operating range is generally bounded above by the capacities of the conveyor units in the anode or cathode supply, the catalytic properties of the electrodes, and/or the proton conductivity of the membranes.

In the third operating mode, the control unit selects as in the second operating mode a transfer function, which maps the pedal value $P_W$ to the power demand $P_{EM}$ such that the net power $P_{net}$ provided by the fuel cell stack as a result of the power demand $P_{EM}$ is sufficient to provide the torque demanded by the driver and an approximated maximum power consumption $P_{aux}$ of the at least one auxiliary unit when providing a power $P_{net}$ corresponding to the desired torque. The power consumption $P_{aux}$ thus does not have to be provided by the net power provided for the acceleration and the full acceleration of the vehicle is available.

As a result of the selected transfer function, this stack net power $P_{net}$ is provided with minimal delay, i.e. in the shortest amount of time technically feasible. The driver thus experiences a maximum response behavior or a maximum gas acceptance. This results in a comparatively high maximum power consumption $P_{aux}^{max}$ of the at least one auxiliary unit and in some circumstances in an intermittent acceleration. In the end, however, more power is available after a shorter period of time than at the same time in the first or second operating mode.

The control unit is preferably configured in the first and in the third operating mode to provide the air-conditioning system in a limited manner depending on the outside temperature by providing the electric auxiliary heater only at a temperature below a first predetermined temperature and the air-conditioning compressor only at a temperature above a second predetermined temperature. The control unit preferably throttles the auxiliary heater and the air-conditioning compressor depending on the temperature and independently of one another, wherein the throttle functions used are essentially inverse to one another. In particular, the throttling of the auxiliary heater increases when the temperature rises and the throttling of the air-conditioner increases when the temperature drops. Particularly preferably, the throttling of the air-conditioning compressor is 100% at a first predetermined temperature and the throttling of the auxiliary heater is 100% at a second temperature. The first temperature is preferably equal to the second temperature and preferably 15° C.

In a preferred embodiment of the fuel cell vehicle according to the invention, the control unit is furthermore configured to operate the fuel cell vehicle depending on the first driver input in a fourth operating mode, in particular in an automated operating mode (auto mode). In doing so, the control unit is configured to provide the air-conditioning system independently of an outside temperature and in an unlimited manner as in the second operating mode and to determine depending on at least one driver, vehicle, or environmental parameter the operating point of the fuel cell stack and the transfer function for determining the power demand $P_{EM}$.

The determined or predicted vehicle parameter is preferably the rotational speed n of the electric motor or variables that can be converted into it, such as a wheel speed, a vehicle speed, and/or a vehicle acceleration. The power demand of an electric motor is a function of its rotational speed and its torque. By using the current rotational speed of an electric motor, the transfer function can thus be varied. The second driver input, in particular the pedal value $P_W$, is thus interpreted differently and results in different power demands $P_{EM}$.

The determined or predicted environmental parameter is preferably a slope of the road or a curve radius. In a downward slope, a certain wheel and motor speed is reached earlier than on a level road. In a downward slope, a transfer function is therefore selected that transfers the second driver input, in particular the pedal value $P_W$, into a lower power demand than on a level road. In an upward slope, the rotational speed and the motor power increase with a delay compared to the level road. There, a transfer function is thus selected that transfers the second driver input into a higher power demand than on a level road. For the curve radii, limit speeds not to be exceeded are determined and a transfer function is selected that limits the power demand $P_{EM}$ independently of the second driver input. Current environmental parameters are preferably detected by means of a sensor, such as a camera or a gyroscope. Predicted environmental parameters are preferably determined from navigation data, in particular from a road profile to be expected.

The driver parameter is preferably a driver profile with information regarding one or more preferred operating modes of the current driver. The driver profile is preferably defined by the driver himself or was automatically learned over time. The different operating modes preferred by the driver are preferably varied depending on a vehicle parameter, such as a speed range, or depending on an environmental parameter, such as highway or country road. The driver is preferably identified by a manual input or automatically, e.g. by identifying a radio key. The fourth operating mode allows for automatically selecting a mode suitable in a given situation or a preferred mode and adjusting the operating mode to vehicle or environmental parameters.

In a preferred embodiment of the fuel cell vehicle according to the invention, the control unit is furthermore configured to operate the fuel cell vehicle depending on the first driver input in a fifth operating mode, in particular in an individual operating mode (individual mode). In doing so, the control unit is configured to provide the air-conditioning system depending on a third driver input, to determine the operating point of the fuel cell stack depending on a fourth driver input, and to determine depending on a fifth driver input the transfer function for determining the power demand $P_{EM}$. Preferably, one or more input means for detecting the third, fourth, and fifth driver input are available to the fuel cell vehicle.

The driver is preferably provided with all options explained in the context of the other operating modes with respect to the provision of the air-conditioning system, the operating point of the fuel cell, and the transfer function for determining the power demand $P_{EM}$. In the fifth operating mode, the degrees of freedom of the driver in the setting of a preferred operating scheme of the fuel cell vehicle are advantageously increased again. The third to fifth driver input is preferably entered via an input device configured for this purpose, such as via an onboard computer of the fuel cell vehicle.

Also preferably, two or more of the third to fifth driver input can be combined to one control value, such as a slider between two competing consumers. Using a slider, a prioritization of the acceleration or the drive or the air-conditioning comfort can, for example, take place, wherein pairs of other control variables are conceivable. Also preferably, the driver can store one or more sets of third to fifth driver inputs entered once as individualized operating modes for later use. In the fifth operating mode, the driver can thus advantageously perform a weighting between system efficiency, comfort, and power availability of the fuel cell vehicle.

In a preferred embodiment of the fuel cell vehicle according to the invention, a first sensor is configured to determine the first driver input based on a mechanical, acoustic, or electromechanical input variable. For this purpose, the first sensor can preferably be designed as a push button, selection wheel, selector lever, or as a touch screen. Also preferably, the first sensor can be designed as an optical sensor for detecting gestures or as an acoustic sensor for detecting voice input. Also preferably, a first sensor is configured to receive a first driver input, which was, for example, entered on a smartphone.

Also preferably, a second sensor is configured to determine the second driver input based on a pedal value and is preferably a pedal value sensor. Also preferably, the first driver input and the second driver input are temporarily detected by means of a single sensor. For example, a pedal value sensor can have an additional kick-down functionality, wherein the third operating mode (dynamic mode) is selected independently of the current operating mode as long as the kick-down stays activated.

Also preferably, the fuel cell vehicle according to the invention comprises an automatic transmission and the control unit is configured to vary the control of the automatic transmission depending on the selected operating mode. Particularly preferably, the control unit is configured to vary the cycle times of the automatic transmission depending on the selected operating mode. For example, the control unit is configured to select cycle times such that the fuel consumption is reduced in the first operating mode and the cycle times of the vehicle are reduced in the second operation mode. Both generally require an early gear change when accelerating and a late gear change when slowing down the speed. The control unit is preferably configured to select the cycle times such that the acceleration of the vehicle is increased. This generally requires an early upshifting. Also preferably, the control unit is configured to adjust the cycle times in the fourth operating mode depending on the at least one driver, vehicle, or environmental parameter and in the fifth operating mode depending on a sixth driver input.

Additional preferred embodiments of the invention arise from the other features stated in the sub-claims.

The various embodiments of the invention mentioned in this application may be combined advantageously with one another unless stated otherwise in individual cases.

BRIEF DESCRIPTION OF THE SEVERAL VIEWS OF THE DRAWINGS

The invention is explained below in exemplary embodiments on the basis of the respective drawings. They show.

DETAILED DESCRIPTION

Figure 1:
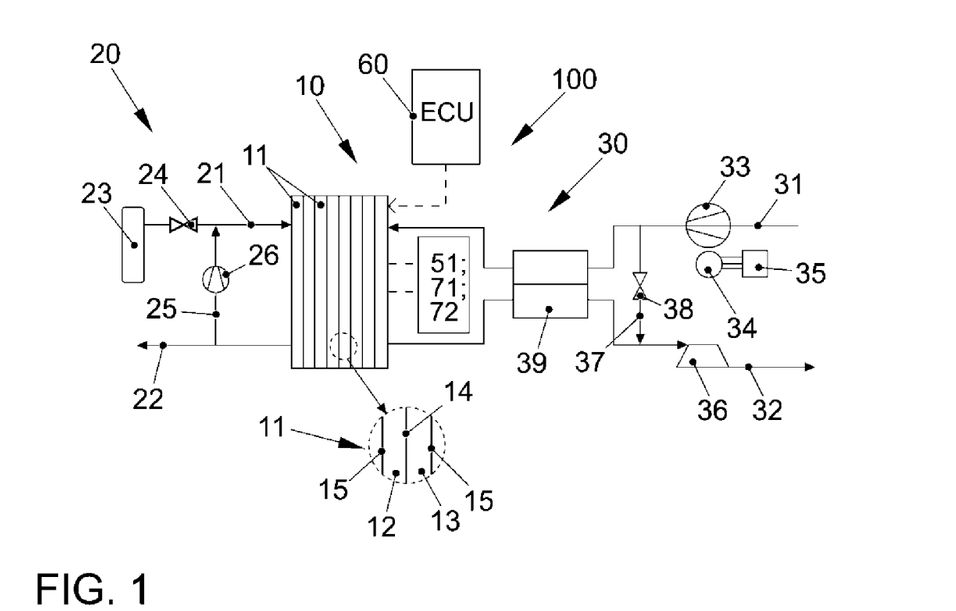
FIG. 1 a schematic representation of a fuel cell system according to an embodiment.

FIG. 1 shows a fuel cell system, denoted overall by 100, according to a preferred embodiment of the present invention. The fuel cell system 100 is part of the vehicle 200 shown in FIG. 2, in particular of an electric vehicle, which comprises an electric traction motor 51, which is supplied with electrical energy by the respective fuel cell system 100.

The fuel cell system 100 comprises as core components a fuel cell stack 10, which comprises a plurality of individual cells 11, which are arranged in the form of a stack and which are formed by alternately stacked membrane electrode assemblies (MEAs) 14 and bipolar plates 15 (see detailed view). Each individual cell 11 thus respectively comprises an MEA 14 with an ion-conductive polymer electrolyte membrane not shown in more detail here and catalytic electrodes arranged thereon on both sides. These electrodes catalyze the respective partial reaction of the fuel conversion. The anode and cathode electrodes are designed as coating on the membrane and comprise a catalytic material, such as platinum, which is provided on an electrically conductive substrate material, with a large specific surface, such as a carbon-based material.

As shown in the detailed view of FIG. 1, an anode chamber 12 is formed between a bipolar plate 15 and the anode and the cathode chamber 13 is formed between the cathode and the next bipolar plate 15. The bipolar plates 15 serve to supply the operating media in the anode and cathode chambers 12, 13 and further establishes the electrical connection between the individual fuel cells 11. Optionally, gas diffusion layers can be arranged between the membrane electrode arrangements 14 and the bipolar plates 15.

To supply the fuel cell stack 10 with the operating media, the fuel cell systems 100 comprise an anode supply 20 on the one hand and a cathode supply 30 on the other hand.

The anode supply 20 of the fuel cell system 100 shown in FIG. 1 comprises an anode supply path 21, which serves to supply an anode operating medium (the fuel), such as hydrogen, to the anode chambers 12 of the fuel cell stack 10. For this purpose, the anode supply paths 21 connect a fuel storage tank 23 to an anode inlet of the fuel cell stack 10. The anode supply 20 also comprises an anode exhaust path 22 which discharges the anode exhaust gas from the anode chambers 12 via an anode outlet of the fuel cell stack 10. The anode operating pressure on the anode sides 12 of the fuel cell stack 10 can be adjusted via an initial adjusting means 24 in the anode supply path 21.

In addition, the anode supply 20 of the fuel cell system shown in FIG. 1 comprises a recirculation line 25, which connects the anode exhaust path 22 to the anode supply path 21. The recirculation of fuel is usual in order to return the fuel, which is in most cases used overstoichiometrically, to the fuel cell stack 10. In the recirculation line 25, a recirculation conveyor 26 is arranged, preferably a recirculation fan.

The cathode supply 30 of the fuel cell system 100 shown in FIG. 1 comprises a cathode supply path 31, which supplies an oxygen-containing cathode operating medium, in particular air taken in from the environment, to the cathode chambers 13 of the fuel cell stack 10. The cathode supply 30 also comprises a cathode exhaust path 32, which discharges the cathode exhaust gas (in particular the exhaust air) from the cathode chambers 13 of the fuel cell stack 10 and supplies it, if appropriate, to an exhaust system (not shown). For conveying and compacting the cathode operating medium, a compressor 33 is arranged in the cathode supply path 31. In the exemplary embodiment shown, the compressor 33 is designed as a compressor 33, which is mainly driven by an electric motor 34 equipped with appropriate power electronics 35. The compressor 33 may also be driven by a turbine 36 (optionally with variable turbine geometry) disposed in the cathode exhaust path 32 via a common shaft (not shown).

The fuel cell system 100 shown in FIG. 1 further comprises a humidifier module 39. The humidifier module 39 is arranged in the cathode supply path 31 on the one hand so that the cathode operating gas can flow through it. On the other hand, the arrangement in the cathode exhaust path 32 allows the cathode exhaust gas to flow through it. A humidifier 39 typically comprises a plurality of water vapor permeable membranes, which are designed to be either flat or in the form of hollow fibers. In this case, the comparatively dry cathode operating gas (air) flows over one side of the membranes and the comparatively moist cathode exhaust gas (exhaust gas) flows over the other side. Driven by the higher partial pressure of the water vapor in the cathode exhaust gas, water vapors pass over the membrane into the cathode operating gas, which is moistened in this way. The cathode supply 30 furthermore comprises a bypass line 37, which connects the cathode supply line 31 to the cathode exhaust gas line 32. An adjusting means 38 arranged in the bypass line 37 serves to control the amount of the cathode operating medium passing by the fuel cell stack 10.

Various further details of the anode and cathode supply 20, 30 are not shown in the simplified FIG. 1 for reasons of clarity. For example, a water separator can be installed in the anode and/or cathode exhaust path 22, 32 in order to condense and drain product water arising from the fuel cell reaction. Finally, the anode exhaust gas line 22 can merge into the cathode exhaust gas line 32 so that the anode exhaust gas and the cathode exhaust gas are discharged via a common exhaust gas system.

The fuel cell system 100 furthermore comprises a control unit 60 and at least one consumer in the form of an electric motor 51 with the electrical power demand $P_{EM}$ and an air-conditioning system 70 with an electric auxiliary heater 71, an air-conditioning compressor 72, and an electrical power demand $P_{AC}$. A detailed description of the function of the control unit 60 is given in the description of FIGS. 2 and 3.

Figure 2:
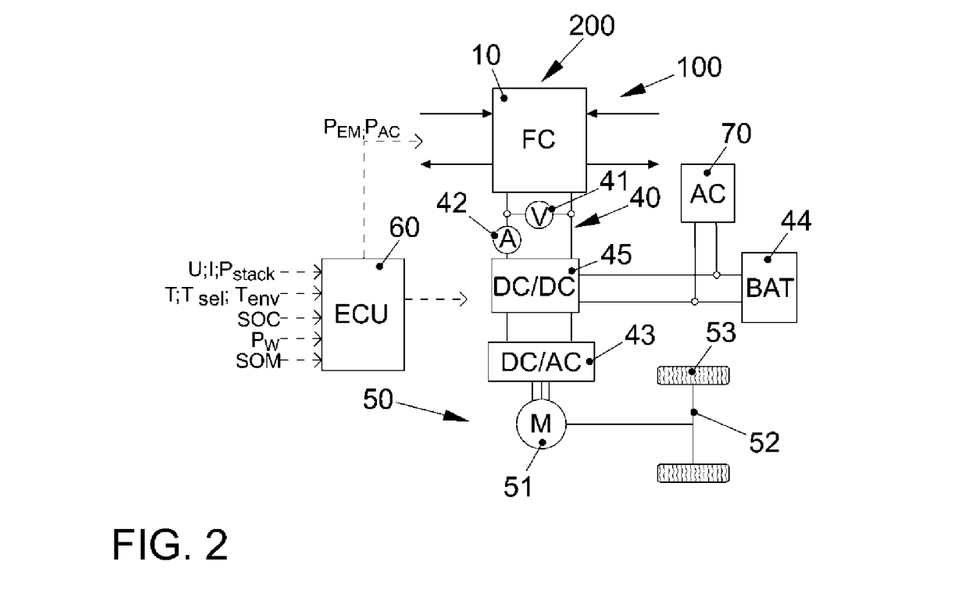
FIG. 2 a schematic representation of a vehicle according to an embodiment.

FIG. 2 shows a vehicle, which is denoted with 200 overall and which comprises the fuel cell system 100 from FIG. 1, the electronic control unit 60 contained therein, an electrical power system 40, and a vehicle drive system 50. The at least one consumer 44, 51, 71, and 72 of the fuel cell system is in this case constituted by components of the fuel cell vehicle.

The electrical power system 40 comprises a voltage sensor 41 for detecting a voltage generated by the fuel cell stack 10, and a current sensor 42 for detecting a current generated by the fuel cell stack 10. The electrical power system 40 furthermore comprises an energy storage unit 44, such as a high-voltage battery or a capacitor. In the power system 40, a converter 45 is furthermore arranged, which is designed in triport topology (triport converter). The battery 44 and the air-conditioning system 70 are connected to a first side of the double DC/DC converter 45. All traction network components of the drive system 50 are connected, with a fixed voltage level, to a second side of the converter 45. In the same or a similar manner, the auxiliary units of the fuel cell system 100 itself, such as the electric motor 34 of the compressor 33 (see FIG. 1), or other electrical consumers of the vehicle can be connected to the power network.

The drive system 50 comprises an electric motor 51, which serves as traction motor of the vehicle 200. To this end, the electric motor 51 drives a drive axle 52 with drive wheels 53 arranged thereon. The traction motor 51 is connected via an inverter 43 to the electronic power system 40 of the fuel cell system 100 and constitutes the main electrical consumer of the system.

The electronic control unit 60 controls the operation of the fuel cell system 100, in particular its anode and cathode supply 20, 30, its electrical power system 40 as well as the traction motor 51 and the air-conditioning system 70. For this purpose, the control unit 60 receives different input signals, such as the voltage U, detected using the voltage sensor 41, of the fuel cell stack 10, the current I, detected using the current sensor 42, of the fuel cell stack 10, the power $P_{stack}$, resulting from the voltage U and the current I, of the fuel cell stack 10, the pressures p in the anode and/or cathode chamber 12, 13, the charge state SOC of the energy storage unit 44, the rotational speed n of the traction motor 51, and other input variables. Alternatively, some of the aforementioned values, such as $P_{stack}$, can also be determined in the control unit 60 itself.

Received by the control unit 60 are furthermore a selector lever position with respect to a selected operating mode (selected operation mode—SOM) as a first driver input, a driving performance $P_W$ requested by a driver of the vehicle 200 as a second driver input, a current temperature T as well as a temperature $T_{sel}$, selected by the driver, of the vehicle interior space, and an outside temperature $T_{env}$. The variable $P_W$ is detected via a pedal value sensor from the force used to operate an accelerator pedal not shown here.

Depending on the first driver input SOM, the control unit 60 determines an operating mode selected by the driver and varies the availability of the air-conditioning system 70 based on the selected operating mode by throttling the possible power consumption of the electric auxiliary heater 71 and the air-conditioning compressor 72 depending on the temperature outside the vehicle $T_{env}$ and thus indirectly sets an upper limit for the power consumption of the air-conditioning system $P_{AC}$. Depending on the selected operating mode, the control unit 60 also determines a transfer function for determining the electrical power demand $P_{EM}$ of the electric motor 51 from the second driver input $P_W$. The determined power demands $P_{EM}$ and $P_{AC}$ are superposed by the control unit 60 and transmitted to the fuel cell stack 10. The control unit 60 furthermore determines an operating point of the fuel cell stack 10 by specifying the electric voltage U demanded from the fuel cell stack 10 and the electric current 10 demanded from the fuel cell stack 10. The determination of the operating point can also include the superposing of an additional transfer function when the power demands $P_{EM}$ and $P_{AC}$ are superposed in order to, for example, delay the resulting power demand. From the resulting total power demand, the control unit 60 determines the required mass flows or operating pressures of the anode and cathode operating medium from calculations or appropriately stored characteristic diagrams and controls the operating medium supply of the fuel cell system, for example, via the electric motor 34 of the compressor 33, as well as the adjusting means 24, 38, etc. of the fuel cell system 100.

Figure 3:
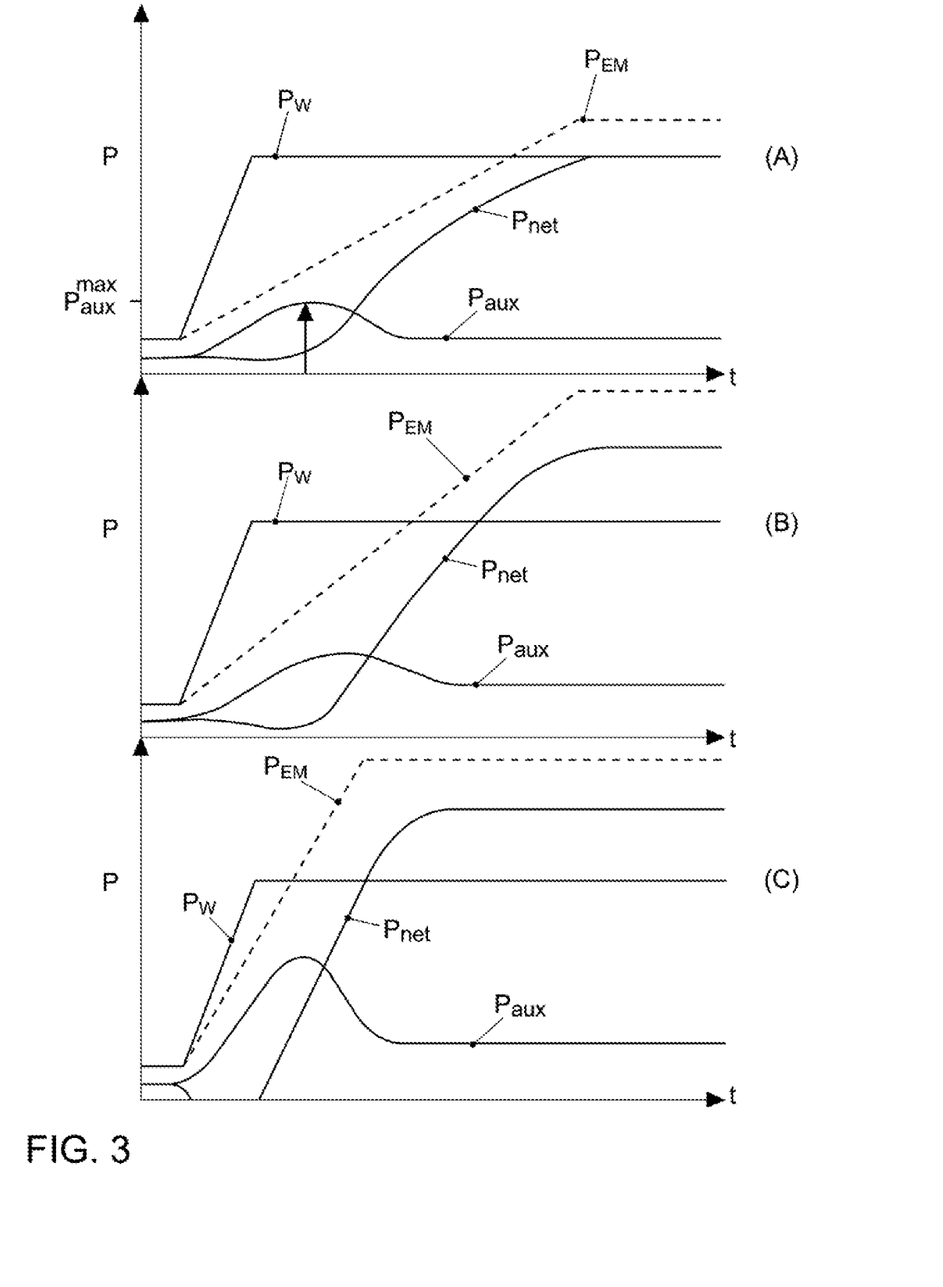
FIG. 3 a schematic representation of a power demand $P_{EM}$, determined based on a pedal value $P_W$, of an electric motor and the net power $P_{net}$, provided as a result of the power demand, of a fuel cell stack, and the power consumption $P_{aux}$, occurring during the provision of the net power, of at least one auxiliary unit.

FIG. 3 shows a schematic representation of a power demand $P_{EM}$, determined based on a pedal value $P_W$, of an electric motor and the net power $P_{net}$, provided as a result of the power demand, of a fuel cell stack, and the power consumption $P_{aux}$, occurring during the provision of the net power, of at least one auxiliary unit.

As shown in FIG. 3(A), a transfer function for determining the electrical power demand $P_{EM}$ is selected in the first operating mode as a result of a first driver input in the form of an increase of the detected pedal value $P_W$ such that the fuel cell stack 10 provides a stack net power $P_{net}$ as a result of this power demand $P_{EM}$, which stack net power corresponds to the increased pedal value $P_W$, in particular to an electrical power required for providing a torque corresponding to the pedal value. The transfer function is also selected such that the power demand $P_{EM}$ increases slowly and the stack net power is thus provided with a certain, in particular non-minimal, delay. As a result of the delay, the maximum power consumption of the at least one auxiliary unit is reduced when providing this stack net power $P_{net}$.

As shown in FIG. 3(B), a transfer function for determining the electrical power demand $P_{EM}$ is selected in the second operating mode as a result of a first driver input in the form of an increase of the detected pedal value $P_W$ such that the fuel cell stack 10 provides a stack net power $P_{net}$ as a result of this power demand $P_{EM}$, which stack net power corresponds to the increased pedal value $P_W$, in particular to an electrical power required for providing a torque corresponding to the pedal value, and a maximum power consumption $P_{aux}^{max}$ to be expected of the at least one auxiliary unit. In the example shown in FIG. 3(B), $P_{aux}^{max}$ corresponds to the maximum power consumption $P_{aux}$ to be expected when providing a stack net power $P^{net}$, which corresponds to the increased pedal value $P_W$, with a non-minimal delay as shown in FIG. 3(A).

Based on the power demand $P_{EM}$, which is increased in comparison to the first operating mode, the full acceleration is available to the driver of the fuel cell vehicle in the second operating mode. In particular, a stack net power corresponding to the pedal value $P_W$ is already available at a point in time, when the available stack net power in the first operating mode is still reduced by about the maximum power consumption $P_{aux}^{max}$ of the at least one auxiliary unit. The transfer function is also selected such that the power demand $P_{EM}$ increases slowly and the stack net power is thus provided with a certain, in particular non-minimal, delay. In particular, the power demand $P_{EM}$ reaches its maximum at the same time as in the first operating mode. As a result of the delay, the maximum power consumption of the at least one auxiliary unit is reduced when providing this stack net power $P_{net}$.

As shown in FIG. 3(C), a transfer function for determining the electrical power demand $P_{EM}$ is also selected in the third operating mode as a result of a second driver input in the form of an increase of the detected pedal value $P_W$ such that the fuel cell stack 10 provides a stack net power $P_{net}$ as a result of this power demand $P_{EM}$, which stack net power corresponds to the increased pedal value $P_W$, in particular to an electrical power required for providing a torque corresponding to the pedal value, and a maximum power consumption $P_{aux}^{max}$ to be expected of the at least one auxiliary unit. In the example shown in FIG. 3(C), $P_{aux}^{max}$ also corresponds to the maximum power consumption $P_{aux}$ to be expected when providing a stack net power $P^{net}$, which corresponds to the increased pedal value $P_W$, with a non-minimal delay as shown in FIG. 3(A).

Based on the power demand $P_{EM}$, which is increased in comparison to the first operating mode, and the smaller delay in comparison to the first and to the second operating mode when making the power demand $P_{EM}$, the full acceleration with the full response behavior or with the full gas acceptance is available to the driver of the fuel cell vehicle in the third operating mode. In particular, a stack net power corresponding to the pedal value $P_W$ is already available at a substantially earlier point in time than in the first operating mode and also earlier than in the second operating mode. As a result of the minimal, exclusively technically required delay in the provision of power, the maximum power consumption $P_{aux}^{max}$ of the at least one auxiliary unit is increased.

LIST OF REFERENCE SYMBOLS

100 Fuel cell system
200 Fuel cell vehicle
10 Fuel cell stack
11 Single cell
12 Anode chamber
13 Cathode chamber
14 Polymer electrolyte membrane
15 Bipolar plate
20 Anode supply
21 Anode supply path
22 Anode exhaust path
23 Fuel tank
24 Adjusting means
25 Fuel recirculation line
26 Recirculation delivery device 30 Cathode supply
31 Cathode supply path
32 Cathode exhaust path
33 Compressor
34 Electric motor
35 Power electronics
36 Turbine
37 Wastegate line
38 Adjusting means
39 Humidifier module
40 Electrical power system
41 Voltage sensor
42 Current sensor
43 Inverter
44 Energy storage unit
45 DC converter
50 Drive system
51 Traction motor
52 Drive axle
53 Drive wheels
60 Control unit
70 Air-conditioning system
71 Electric auxiliary heater
72 Air-conditioning compressor

The invention claimed is:

1. A fuel cell vehicle, comprising:
a fuel cell system having a fuel cell stack for providing an electrical power $P_{stack}$ and at least one auxiliary unit for operating the fuel cell stack with an electrical power consumption $P_{aux}$;
an air-conditioning system for regulating a temperature of a vehicle interior space, the air-conditioning system including an electric auxiliary heater and an air-conditioning compressor with a collective electrical power demand $P_{AC}$;
an electric motor for driving the fuel cell vehicle with a power demand $P_{EM}$;
a plurality of sensors for detecting a temperature outside of the fuel cell vehicle, a first driver input, and a second driver input; and
a control unit that is configured to operate the fuel cell vehicle, based on the first driver input, in one of a plurality of operating modes, each operating mode of the plurality of operating modes provides a power consumption $P_{AC}$ of the air-conditioning system, an operating point of the fuel cell stack, and a transfer function for determining the power demand $P_{EM}$ from the second driver input;
wherein the control unit is configured to operate the fuel cell vehicle in a first operating mode that:
provides the air-conditioning system in a first manner based the temperature outside of the fuel cell vehicle;
provides the operating point of e fuel cell stack at or near a first efficient operating point; and
selects the transfer function for determining the power demand $P_{EM}$ such that the fuel cell stack provides a net power $P_{net}$ with a first delay based on the second driver input, the first delay being greater than a threshold delay.

2. The fuel cell vehicle according to claim 1 wherein the control unit is configured to operate the fuel cell vehicle in a second operating mode that:
provides the air-conditioning system in a second manner independent of the temperature outside of the fuel cell vehicle;
provides the operating point of the fuel cell stack at or near a second threshold sound emission operating point; and
select the transfer function for determining the power demand $P_{EM}$ such that the fuel cell stack provides a net power $P_{net}$ with a second delay based on the second driver input and a threshold power consumption $P_{aux}^{max}$ of the at least one auxiliary unit, the second delay being greater than the threshold delay.

3. The fuel cell vehicle according to claim 1 wherein the control unit is further configured to determine the second delay such that a threshold power consumption $P_{aux}^{max}$ of the at least one auxiliary unit is reduced.

4. The fuel cell vehicle according to claim 2 wherein the control unit is configured to operate the fuel cell vehicle in a third operating mode that:
provides the air-conditioning system in the first manner based on the temperature outside of the fuel cell vehicle;
provides the operating point of the fuel cell stack at a third intermediate operating point; and
select the transfer function for determining the power demand $P_{EM}$ such that the fuel cell stack provides a net power $P_{net}$ with a third delay based on the second driver input and a threshold power consumption $P_{aux}^{max}$ of the at least one auxiliary unit.

5. The fuel cell vehicle according to claim 1 wherein the first manner includes providing the electric auxiliary heater at a temperature below a first predetermined temperature, and providing the air-conditioning compressor at a temperature above a second predetermined temperature.

6. The fuel cell vehicle according to claim 3 wherein the control unit is configured to operate the fuel cell vehicle in a fourth operating mode that:
provides the air-conditioning system independent of the temperature outside of the fuel cell vehicle in the second manner;
determines the operating point of the fuel cell stack based on a driver, a vehicle, or an environmental parameter; and
selects the transfer function for determining the power demand $P_{EM}$ based on the driver, the vehicle, or the environmental parameter.

7. The fuel cell vehicle according to claim 6 wherein the control unit is configured to operate the fuel cell vehicle in a fifth operating that:
provides the air-conditioning system based on a third driver input;
determine the operating point of the fuel cell stack based on a fourth driver input; and
determine the transfer function for determining the power demand $P_{EM}$ based on a fifth driver input.

8. The fuel cell vehicle according to claim 1 wherein the plurality of sensors includes:
a first sensor configured to determine the first driver input based on a mechanical, acoustic, or electromechanical input variable; and
a second sensor configured to determine the second driver input based on a pedal value.

9. The fuel cell vehicle according to claim 1, further including an automatic transmission, wherein the control unit is configured to vary control of the automatic transmission based on one of the plurality of operating modes.

10. The fuel cell vehicle according to claim 2 wherein the control unit is further configured to determine the second delay such that the threshold power consumption $P_{aux}^{max}$ of the at least one auxiliary unit is reduced.

11. A device, comprising:
a fuel cell system having a fuel cell stack;
an air-conditioning system;
an electric motor;
a first sensor that detects in operation a temperature;
a second sensor that detects in operation a first driver input;
a third sensor that detects in operation a second driver input; and
a control unit coupled to the fuel cell system, the air-conditioning system, and the electric motor, the control unit selects one of a plurality of operating modes based on the first driver input and the second driver input, each operating mode provides a power consumption of the air-conditioning system, an operating point of the fuel cell stack, and a transfer function that determines a power demand in response to the second driver input;
wherein the plurality of operating modes includes a first operating mode that:
operates the air-conditioning system in a first manner based on the temperature;
provides the operating point of the fuel cell stack is at or near a first efficient operating point, and
determines the transfer function to provide the fuel cell stack a net power with a first delay in response to the second driver input, the first delay being greater than a threshold delay.

12. The device according to claim 11 wherein the plurality of operating modes includes a second operating mode that:
operates the air-conditioning system in a second manner independent of the temperature;
provides the operating point of the fuel cell stack at or near a second threshold sound emission operating point; and
determines the transfer function to provide the fuel cell stack a net power with a second delay based on the second driver input and a threshold power consumption of an auxiliary unit that operates the fuel cell stack, the second delay being greater than the threshold delay.

13. The device according to claim 12 wherein the control unit determines in operation the second delay such that the threshold power consumption is reduced.

14. The device according to claim 12 wherein the plurality of operating modes includes a third operating mode that:
operates the air-conditioning system in the first manner based on the temperature;
provides the operating point of the fuel cell stack at a third intermediate operating point; and
determines the transfer function of the power demand such that the fuel cell stack provides a net power with a third delay based on the second driver input and a threshold power consumption of an auxiliary unit that operates the fuel cell stack.

15. The device according to claim 14 wherein the plurality of operating modes includes a fourth operating mode that:
operates the air-conditioning system in the second manner independent of the temperature;
provides the operating point of the fuel cell stack: and
determines the transfer function of the power demand based on a driver, a vehicle, or an environmental parameter.

16. The device according to claim 15 wherein the plurality of operating modes includes a fifth operating mode that:
operates the air-conditioning system in response to a third driver input;
provides the operating point of the fuel cell stack in response to a fourth driver input; and
determines the transfer function of the power demand based on a fifth driver input.

17. The device according to claim 11, further including an automatic transmission, wherein the control unit varies in operation control of the automatic transmission based on one of the plurality of operating modes.

* * * * *

UNITED STATES PATENT AND TRADEMARK OFFICE
CERTIFICATE OF CORRECTION

PATENT NO. : 10,449,859 B2  
APPLICATION NO. : 15/592130  
DATED : October 22, 2019  
INVENTOR(S) : Nils Brandau et al.

Page 1 of 1

It is certified that error appears in the above-identified patent and that said Letters Patent is hereby corrected as shown below:

In the Claims

Column 15, Claim 1, Line 54:
"based the temperature" should read, --based on the temperature--.

Column 15, Claim 1, Line 55:
"point of e fuel cell" should read, --point of the fuel cell--.

Column 16, Claim 6, Line 32:
"claim 3 wherein" should read, --claim 4 wherein--.

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*